United States Patent Office 3,552,142
Patented Jan. 5, 1971

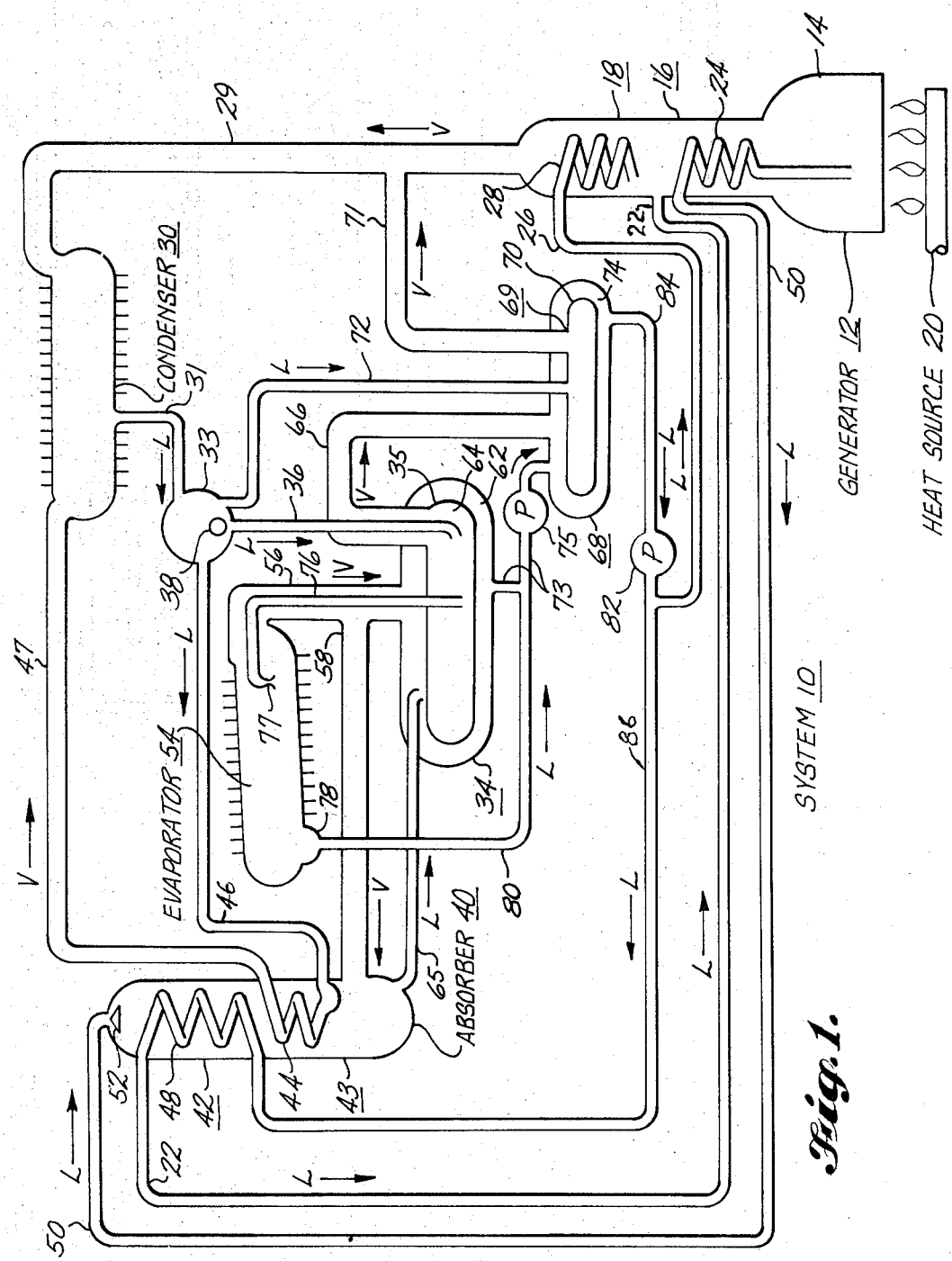

3,552,142
ABSORPTION REFRIGERATION SYSTEM WITH MULTIPLE ABSORPTION STAGES
Ralph C. Schlichtig, 11212 3rd S.,
Seattle, Wash. 98168
Filed Jan. 16, 1969, Ser. No. 791,650
Int. Cl. F25f 29/00
U.S. Cl. 62—485      5 Claims

ABSTRACT OF THE DISCLOSURE

This refrigeration system includes a first absorber, an evaporation heat exchanger, a second absorber for drawing refrigerant vapor from the evaporation heat exchanger and absorbing the refrigerant vapor in an absorbent to thereby enrich the refrigerant in the absorbent passing successively through the first absorber, the evaporation heat exchanger, and the second absorber so that the boiling point of the enriched solution is so lowered that boiling of the enriched solution can be initiated within a heat exchange conduit associated with the first absorber thereby increasing the C.O.P. and making the generator more effective in separating refrigerant from enriched solution.

---

Figure 2A:
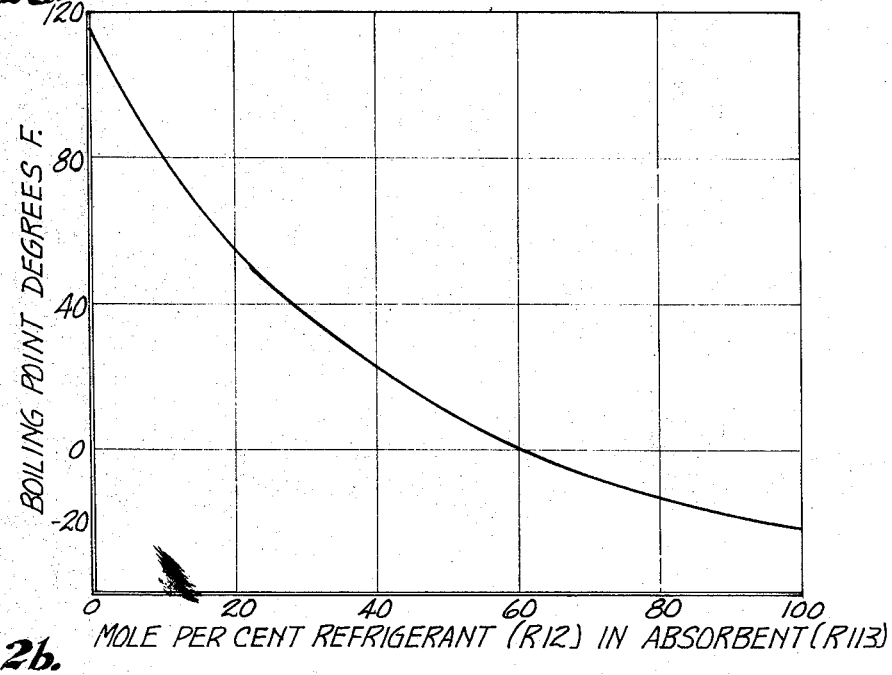

This application is related to United States patent application Ser. No. 791,649 filed even date herewith by the same applicant and entitled "Heating and Cooling System."

This invention relates to thermally powered absorption type refrigeration systems and more particularly to such a refrigeration system capable of employing nonflammable and safe fluorocarbon refrigerants with a desirably high coefficient of performance for the system.

Prior art absorption type refrigeration systems have been devised to achieve adequately high concentration of refrigerant in absorbent material in the absorber by the choice of highly polar substances for both the refrigerant and the absorbent material, rather than by special means within the system itself to augment the degree of concentration of refrigerant in absorbent material in the absorbent solution that is returned to the generator. The two commonly used working substance combinations are ammonia for the refrigerant and water as the absorbent, and water for the refrigerant and lithium bromide as the absorbent. Another such combination that is good thermodynamically is water as refrigerant and sulphuric acid as absorbent. Such solutions are called electrolytes. But the use of polar substances, electrolytes, has its hazards. Most polar substances are toxic, flammable, corrosive, or solid at ordinary ambient temperatures. Water is the only safe polar refrigerant, but its vapor has the disadvantage of having extremely high specific volume at the normal operating temperature for the evaporator and the absorber so that conducting passages within and between these components are necessarily very large to prevent exceeding the few thousandths of a pound per square inch pressure drop permissible along the passages. The specific volume of saturated water vapor at 40 degrees F. is 2440 cubic feet while the specific volume of dichlorodifluoromethane (R12) at the same temperature is .8 cubic feet. In contrast, when using R12, a pressure drop along required passages of a pound or more per square inch is permissible. In addition, evaporators using water as refrigerant are easily frozen and damaged. Water as a refrigerant must of course be matched to one of the other polar substances such as lithium bromide which has a tendency to solidify even at room temperature. In addition to these disadvantages, the chemical affinity between polar refrigerant and polar absorbent material demands that much more heat is required in a generator to separate a pound of refrigerant from absorbent material than is usefully absorbed in the evaporator as heat of vaporization when a pound of separated refrigerant evaporates. Furthermore, the great affinity between polar refrigerant and polar absorbent material makes separation and rectification of the vapor from the generator more difficult. Therefore much of the inventiveness of prior art absorption type refrigeration systems has dealt with overcoming the disadvantages of polar refrigerant and polar absorbent material.

In absorption type refrigeration systems it is necessary to repeatedly or cyclically separate refrigerant from the absorbent material that has absorbed much refrigerant, such solution being hereinafter referred to as rich solution. The absorbent material must have a relatively much higher boiling point than that of the rich solution in order to effect good separation of refrigerant from absorbent material by thermal distillation in the generator.

Therefore, an object of this invention is to provide for enriching the refrigerant in the absorbent solution returning to the generator so there is less absorbent material associated with each pound of refrigerant thereby minimizing the total volume of absorption solution that must be pumped back into the generator of an absorption type refrigeration system utilizing relatively nonpolar working substances, to thus reduce the mechanical power for driving the pump that pumps the enriched solution back into the generator.

Another object of this invention is to provide, in an absorption type refrigeration system utilizing relatively nonpolar working substances, for so increasing the concentration of refrigerant in the absorbent solution that is directed through the heat exchange conduit disposed within an absorber that heat derived from the absorber can aid in boiling refrigerant from the concentrated solution of refrigerant in absorbent material and thus reduce the amount of heat required in the generator for separating refrigerant vapor from the absorbent material and for directing this separated refrigerant vapor to the condenser.

Another object of this invention is to provide for increasing the concentration of refrigerant in the absorbent solution that is returning to the generator, thereby producing vapor that requires from the generator a smaller quantity of heat for each pound of refrigerant that is caused to flow from the generator to the associated condenser, to thereby increase the efficiency of the thermal cycle for a given available combination of fluorocarbon refrigerant and absorbent material in a thermally powered absorption type refrigeration system utilizing relatively nonpolar working substances.

A further object of this invention is to provide for reducing the operating temperature of the rectifying portion of the generator so that the absorption solution leaves the generator at a lower temperature to thus carry away less heat to increase the overall efficiency of the refrigeration system and to provide for increasing the temperature of the rich solution returning to the generator, to thereby eliminate the need for a heat exchanger between such liquid carrying conduits leaving from and returning to the generator.

Other objects of this invention will become apparent from the following description when taken in conjunction with the accompanying drawings in which:

FIG. 1 is a schematic diagram of a preferred embodiment of this invention in which means is provided for accomplishing the foregoing objects in a thermally powered absorption type refrigeration system utilizing relatively nonpolar working substances.

Figure 2B:
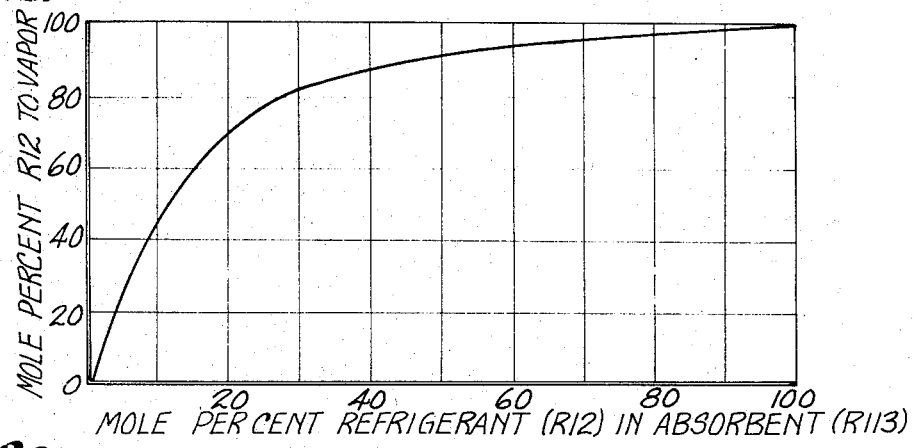
Figure 2C:
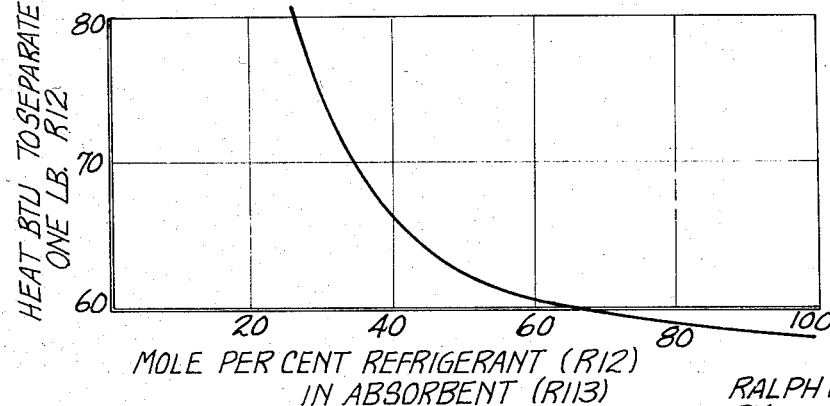

FIGS. 2a through 2c are graphs illustrating in the case of a suitable solution of dichlorodifluoromethane (R12) as refrigerant in trichlorotrifluoroethane (R113) as absorbent, what effect molar percent concentration of a refrigerant has on the three important solution properties, namely, boiling point, approximate molar percent composition of vapor boiling from the liquid solution, and the calculated amount of heat required to boil off each pound of refrigerant. The general trends of these curves are representative of those properties of refrigerant and absorbent material that are characteristic of nonpolar compounds which have weak chemical affinity for each other.

Referring to FIG. 1 there is shown on thermally powered absorption type refrigeration system 10 illustrating the preferred embodiment of this invention in which relatively nonpolar working substances such as dichlorodifluoromethane (R12) and trichlorotrifluoroethane (R113) are utilized. Of course, it is to be understood that other suitable nonpolar working substances could be utilized.

A generator 12 has as functional sections a boiler section 14, an analyzer section 16 and a rectifier section 18, and is heated by a heat source 20. Preheated rich solution that has been increased in concentration of refrigerant enters the analyzer section 16 of the generator 12 by way of a return conduit 22 and refrigerant-rich vapor is produced within the analyzer 16 that is richer in refrigerant than that produced within the boiler 14. In particular, a portion of the rich solution that enters the analyzer section 16 flows over a heat exchange tube 24, within the analyzer section 16, which conveys an absorbent solution strong in absorbent material from the bottom portion of the boiler 14, to thereby produce refrigerant-rich vapor. A rich solution cooler than that entering by way of the conduit 22 enters the rectifier section 18 of the generator 12 by way of the conduit 26 and flows through a heat exchange tube 28 of the rectifier section 18 to discharge into the analyzer section 16, and also produces refrigerant-rich vapor as it flows down over the surface of the hot heat exchange tube 24. As the refrigerant-rich vapor flows upward through the rectifier section 18 in contact with the cooler heat exchange tube 28 absorbent material is condensed from the vapor, thus leaving nearly pure refrigerant vapor to be discharged by way of a conduit 29.

A condenser 30 which is cooled by ambient air through cooling fins in the conventional manner, receives and condenses refrigerant vapor. A conduit 31 drains condensed refrigerant from the condenser 30 into an accumulator 33.

An evaporation heat exchanger 34 that has two compartments separated by an extensive heat exchange partition 35 receives from the accumulator 33 liquid refrigerant into one of the compartments by means of the conduit 36 and the flow regulator 38.

An absorber 40 has two main sections, a high temperature section 42 and an ambient temperature section 43 in thermal communication with an evaporator coil 44 disposed within the ambient temperature section 43 and connected to the accumulator 33 by a conduit 46 to receive refrigerant liquid. Heat is carried away from the high temperature section 43 by rise and flow of vapor through a conduit 47. The absorber 40 also houses a preheat exchanger 48 which is shown as a tube formed into a helical coil through which rich solution flows so as to be preheated from other liquid on the outer surface of the preheat exchanger 48. A conduit 50 is interconnected between the exit of the heat exchanger tube 24 of the generator 12 and the top of the high temperature section 42 of the absorber 40 for delivering hot solution strong in absorbent material to the absorber 40. A distributor 52 is disposed within the top of the absorber 40 so that strong absorbent solution entering the absorber 40 from the conduit 50 is restricted in flow and spreads out over the surface of the preheat exchanger 48 in absorbing contact with refrigerant vapor received from an evaporator 54 which provides a cooling effect to the space to be cooled or refrigerated. The refrigerant vapor from the evaporator 54 enters the high temperature section 42 of the absorber 40 at evaporator pressure by means of conduits 56 and 58 and heats the preheat exchanger 48 and the rich solution therein with which it is in thermal contact as refrigerant vapor is absorbed within the high temperature section 42 and liberates its heat of vaporization. As the liquid absorbent material within the high temperature section 42 becomes laden with refrigerant the resulting rich solution drops into the ambient temperature section 43 of the absorber 40 where more refrigerant vapor can be absorbed at near ambient temperature. The heat that is generated by this latter absorption is dissipated by evaporation taking place within the evaporator coil 44.

The evaporation heat exchanger 34 includes an outer compartment 62 which is insulated from ambient heat, and an inner compartment 64 which functions as an evaporator. The evaporation heat exchanger 34 is operatively associated with the absorber 40 and with the condenser 30 so that a solution of refrigerant and absorbent material passes from the absorber 40 into the outer compartment 62 of the evaporation heat exchanger 34, and so that condensed refrigerant passes from the condenser 30 into the inner compartment 64 of the evaporation heat exchanger 34. The evaporation heat exchanger 34 is also operatively associated with the evaporator 54 so that a portion of the refrigerant evaporated within the evaporator 54 passes into the outer compartment 62 of the evaporation heat exchanger 34 and is absorbed by the cooled absorbent material within the outer compartment 62. In particular, the remaining refrigerant vapor in excess of what can be absorbed in the ambient temperature section 43 of the absorber 40, passes through a connecting conduit 56 to the evaporation heat exchanger 34. Absorbent liquid material and its dissolved refrigerant drains to the outer compartment 62 of the evaporation heat exchanger 34 by a conduit 65 and is disposed in heat transfer relationship with the inner compartment 64 of the evaporation heat exchanger 34. Liquid refrigerant enters the inner compartment 64, in which the vapor pressure is above the pressure within the evaporator 54, by means of the conduit 36. Refrigerant vapor is withdrawn from the inner compartment 64 through a conduit 66 into an absorber 68 and cooling within the inner compartment 64 results from evaporation of a portion of the liquid refrigerant disposed within the inner compartment 64. The remaining portion of liquid refrigerant disposed within the inner compartment 64 is cooled by evaporation; and absorbent material with dissolved refrigerant disposed within the outer compartment 62 is likewise cooled below ambient temperature as it flows from the conduit 65 and spreads over the outer surface of the cool inner compartment 64 of the evaporation heat exchanger 34 in absorbing contact with refrigerant vapor received from the conduit 56. The absorbent material thus cooled acquires the capacity to absorb considerably more refrigerant vapor, therefore more refrigerant vapor is absorbed by the solution to thus become a richer solution of refrigerant and absorbent material, and heat thus liberated is removed by evaporation of refrigerant liquid within the inner compartment 64; in other words the saturation concentration of the refrigerant in the solution of refrigerant and absorbent material within the outer compartment 62 is increased.

To provide heat dissipation to the ambient heat sink and thus cool the liquid within the absorber 68 a heat dissipator 69 is provided. Although heat may be dissipated from the absorber 68 by simple radiation fins (not shown), the preferred form of heat dissipator 69 includes an evaporator compartment 70, a conduit 71 which may as shown be associated with the condenser 30, and a refrigerant supply conduit 72. This form of heat dissipator 69 permits heat from the absorber 68 to be dissipated at a considerable distance such as to the condenser 30 which may be out of doors from the absorber 68.

In order to deliver the enriched solution of refrigerant and absorbent material from the outer compartment 62 of the evaporation heat exchanger 34 and into the outer compartment 74 of the absorber 68 at a pressure that is higher than the pressure within the outer compartment 62 of the evaporation heat exchanger 34, a conduit 73 and associated pump 75 are provided.

The remaining cooled liquid refrigerant disposed within the inner compartment 64 of the evaporation heat exchanger 34 is conveyed to the evaporator 54 by means of a siphon tube 76 which has a flow control 77 for regulating the flow of liquid refrigerant to the evaporator 54. The inner compartment 64 of the evaporation heat exchanger 34 thus functions also as a refrigerant precooler for the refrigerant liquid conveyed to the evaporator 54.

The evaporator 54 as illustrated is of the conventional finned type which evaporates at reduced pressure refrigerant liquid which is received through the siphon tube 76 to thereby cool the surrounding space. Resulting cool refrigerant vapor leaves the evaporator 54 through the conduit 56 in heat transfer relationship with the liquid within the siphon tube 76 and the refrigerant liquid therein is further cooled before entering the evaporator 54.

In order to prevent any nonevaporated liquid refrigerant from overflowing from the evaporator 54 and into the absorber 40 to dilute and weaken the absorbent solution within the absorber 40, a sump 78 is provided to collect such overflow liquid and return it to the absorber 68. For such purpose a conduit 80 is interconnected between the sump 78 and the conduit 73.

In order to deliver the final rich liquid from the outer compartment 74 of the absorber 68 to both the heat exchange tube 28 of the rectifier section 18 and to the preheat exchanger 48 of the absorber 40, a pump 82 and associated conduits 84, 86 and 26 are provided.

The operation of the absorption type refrigeration system 10 as shown in FIG. 1 will now be described with a suitable refrigerant dichlorodifluoromethan (R12) and a suitable absorbent material trichlorotrifluoroethane (R113), the latter of which has a much higher boiling point than the refrigerant in absorbent as illustrated by FIG. 2a.

Liquid solution of absorbent material containing a relatively high concentration of dissolved refrigerant, in other words a rich solution, is pumped into the heated generator 12 by way of the conduit 22 and the conduit 26. Such rich solution that enters the generator runs down over the surface of the heat exchange tube 24 in the presence of hot vapor rising from the boiler 14 so that a vapor is distilled off with changing composition according to FIG. 2b so that all positions downward through the analyzer 16 the vapor produced is richer in refrigerant than the liquid from which it is distilled, but both liquid and vapor are progressively less rich in refrigerant toward the bottom of the boiler 14 where the temperature must also be higher according to FIG. 2a. Rising vapor is then stripped of absorbent vapor by condensing the absorbent vapor as the mixed vapor passes upward over the cooler surface of the heat exchange tube 28 so that rectified refrigerant vapor is discharged to the condenser 30 at essentially condenser pressure by way of the conduit 29. At the same time, strong hot absorbent material that reaches the bottom of the boiler section 14 of the generator 12 leaves through the heat exchange tube 24 where sensible heat from the hot absorption material is transferred to the incoming rich solution, and the strong absorbent material returns to the absorber 40 through the conduit 50.

The amount of heat in B.t.u. required to separate each pound of refrigerant vapor that is returned to the condenser 30 is determined by the concentration of refrigerant in terms of mole percent of refrigerant in the vapor derived from the rich solution entering the analyzer section 16 of the generator 12 as shown by the graph of FIG. 2c. The reason for the lower value of heat required for evaporating each pound of refrigerant from the solution of refrigerant in absorbent material as the solution as measured in mole percent becomes richer according to FIG. 2c is that the molar heat of vaporization for the absorbent material is much greater than that of the refrigerant, and that according to FIG. 2b molar amount of absorbent material originally evaporated with each mole of refrigerant vapor is much less with the use of richer solution of refrigerant in absorbent material. Furthermore, preheating and boiling of the strong solution before it enters the generator reduces the amount of heat that must be supplied to the generator 12 by the heat source 20. It follows that the rich solution entering the analyzer section 16 should have a high concentration of refrigerant.

The separated strong liquid absorbent material is allowed to return to the high temperature section 42 of the absorber 40 by way of the conduit 50 at a temperature comparable to that within the high tempertaure section 42. The strong solution spreads down over the preheat exchanger tube 48 where refrigerant vapor which is supplied by the evaporator 54 is absorbed, thus reducing the vapor pressure within the absorber 40 to slightly less than the pressure within the evaporator 54 to induce evaporation of refrigerant within the evaporator 54 and to thus produce useful cooling. The simultaneous condensation of the refrigerant and absorption of the refrigerant in the strong solution liberates heat of condensation at a sufficiently high temperature to heat the rich solution within the preheat exchanger tube 48 of the absorber 40. Fresh refrigerant liquid is supplied to the evaporator 54 from the evaporation heat exchanger 34 through the siphon tube 76. The resulting heat of condensation plus the original sensible heat of the entering strong absorbent material is transferred through the walls of the preheat exchanger 48 to the rich solution of refrigerant that is within the preheat exchanger 48 to preheat and to initiate boiling of the rich solution of refrigerant in absorbent that is to be returned to the generator 12. Additional refrigerant vapor from the evaporator 54 is absorbed in the solution in the ambient temperature section 43 of the absorber 40, and the liberated heat is dissipated by the evaporator coil 44.

The resulting solution of refrigerant in absorbent material is delivered by means of the conduit 65 into the outer compartment 62 of the evaporation heat exchanger 34 where it is cooled by thermal contact with the inner compartment 64 disposed in the evaporation heat exchanger 34, where a portion of the refrigerant received from the condenser 30 is evaporated at a temperature and corresponding pressure intermediate between the evaporator 54 and the condenser 30 to thus produce the cooling effect required in the outer compartment 62 of the evaporation heat exchanger 34. The cooling of the solution of refrigerant in absorbent material within the outer compartment 62 of the evaporation heat exchanger 34 reduces its vapor pressure to a value sufficiently less than the vapor pressure within the evaporator 54 that additional vapor is caused to flow from the evaporator 54 through the conduit 56 and into the outer compartment 62 where it is absorbed in the solution of refrigerant in absortpion material received from the absorber 40 through the conduit 65, thus enriching the solution. Cooling effect caused by evaporation of a portion of the refrigerant within the inner compartment 64 of the evaporation heat exchanger 34 also precools the remaining portion of the refrigerant liquid which leaves by means of the siphon tube 76 and the flow control 77 to the evaporator 54.

The solution of increased refrigerant concentration then joins any overflow refrigerant from sump 78 through the passage 80 and is delivered by the pump 75 and associated conduit 73 to the absorber 68 where further refrigerant vapor evaporated from within the inner compartment 64 of the evaporation heat exchanger 34 is absorbed at a temperature slightly above ambient due to the vapor pressure being greater than the evaporator 54 pressure as communicated to the outer compartment 62, to thereby further increase the saturation concentration of refrigerant in the solution of refrigerant and absorbent material within this absorber 68, in other words, the solution becomes rich with a consequent lowered boiling point. Heat produced within the absorber 68 is dissipated by the evaporative cooling within the evaporator compartment 70.

A portion of rich refrigerant solution is then delivered by the pump 82 and associated conduits 84 and 26 to the heat exchanger tube 28 of the rectifier 18 and the remaining portion of the rich refrigerant solution is delivered by the pump 82 and associated conduits 84 and 86 to the preheat exchanger 48 of the absorber 40 where it is preheated and brought to boiling, from whence the hot rich solution and any vapor formed is delivered to the analyzer 16 of the generator 12 by way of the conduit 22. The cooling effect of the portion of this rich solution as it enters the heat exchanger tube 28 from the absorber 68 is to rectify the vapor mixture that is rising from lower in the generator 12 so that more nearly pure refrigerant vapor is supplied out through the conduit 29 to be condensed in the condenser 30. This helps to insure a low boiling point refrigerant so that the evaporator 54 can operate at a desirable low temperature without leaving parasitic high boiling point absorbent residue that must be drained back by way of the sump 78 and the conduit 80 to the pump 75.

The refrigerant condensed in the condenser 30 flows from the condenser 30 through the conduit 31 to the accumulator 33. From the accumulator 33 a portion of the liquid refrigerant flows through the conduit 46 to the evaporator coil 44 from whence the resulting vapor returns to the condenser 30 by way of the conduit 47. From the accumulator 33 another portion of refrigerant liquid flows through the conduit 72 to the evaporator compartment 70 of the absorber 68 to provide evaporative cooling within the evaporation compartment 70 from whence the resulting vapor returns to the condenser 30 through the conduits 71 and 29. Also liquid refrigerant flows from the accumulator 33 through the flow regulator 38 and the conduit 36 to the inner compartment 64 of the evaporation heat exchanger 34 to provide necessary cooling to maintain the temperature below ambient in the inner compartment 64.

Although the preferred means for dissipating heat from the absorber 40 is shown as an evaporator coil 44, it is to be understood that fins (not shown) on the ambient temperature section 43 can replace the evaporator coil 44 and associated conduits 46 and 47.

It is further to be understood that the evaporator 54 can be divided into two sections (not shown) which are supplied with refrigerant liquid by separate conduits (not shown) connected to receive refrigerant liquid from the accumulator 33. One such section of the evaporator delivers vapor refrigerant through a separate conduit (not shown) to only the outer compartment 62 of the evaporation heat exchanger 34 and the other such section of the evaporator delivers vapor refrigerant through another separate conduit (not shown) to only the absorber 40, thus eliminating the need for the conduits 56 and 58, so that the two sections of the evaporator can operate at separate temperatures and pressures such that the vapor pressure inside the absorber 40 may be higher than the vapor pressure inside the outer compartment 62 of the evaporation heat exchanger 34. Of course separate sumps (not shown) such as the sump 78 must be provided for such sections of the evaporator and separate conduits (not shown) such as the conduit 80 must be provided for returning overflow and unevaporated refrigerant from each such section of the evaporator to the pump 75. By providing such separate sections (not shown) for the evaporator and by connecting them to the remainder of the apparatus as heretofore described, the coefficient of performance of the system is improved, particularly when the cooling load is high and the air temperature has thereby risen in the space to be cooled by these two sections of the evaporator. This improvement in coefficient of performance at the time when most desired is effected by the arrangement such that the higher temperature and pressure section of the evaporator is staged in the space air stream so that the warmer air contacts it first before it does the lower pressure section of the evaporator, thus permitting the high temperature and pressure section of the evaorator to absorb much more heat and produce correspondingly more refrigerant vapor which, with its higher pressure, is absorbed in the first absorber 40 to increase the amount of useful heat liberated in the high temperature section 42 of the absorber 40 that is transferred to the rich solution within the preheat exchanger 48 and to increase the concentration of refrigerant in the rich solution leaving the first absorber 40. This in turn requires a smaller portion of the heat of the generator 12 to be used in distilling off that portion of the refrigerant vapor that is condensed in the condenser 30 and flows as liquid refrigerant to the inner compartment 64 of the evaporation heat exchanger 34 and is subsequently evaporated so as to be absorbed in the absorber 68. Thus if one is seeking high coefficient of performance instead of simplicity this modified system using two sections for evaporator at two temperatures and pressures would be preferred.

The refrigeration apparatus embodying the teachings of this invention has several advantages. For instance this apparatus has the capability of using nontoxic and nonflammable fluorocarbon refrigerants efficiently so that the apparatus can be safely placed in the living area of a structure. Also the pressure and temperature within the generator of this refrigeration apparatus is minimized. Further the volume of rich solution to be pumped back to the generator is minimized thus reducing the pumping problem. In addition, the overall efficiency of this absorption type refrigeration system utilizing nonpolar working substances is maintained at a reasonable overall efficiency or C.O.P. Another advantage of this absorption type refrigeration apparatus is that it can operate efficiently with nonpolar refrigerants from which several can be chosen with vapor pressure hundreds of times greater than the vapor pressure of water at similar temperature and thus so that the evaporator can be located at a convenient place that may be a considerable distance from the rest of the apparatus. A further advantage of this apparatus is that it can use working substances that will not freeze or solidify at even freezing temperatures. Still another advantage of this sytsem is that working substances may be used so that the heat from the condenser and absorbers can be dissipated outdoors while the remainder of the apparatus is indoors. A further advantage of this absorption type refrigeration apparatus is that it can operate with sufficient temperature spread between evaporator on the one hand and absorber and condenser on the other hand that all the waste heat can be dissipated to the ambient air without the use of a water cooling tower.

I claim as my invention:

1. A refrigeration system comprising the following connected to form a closed system: generator means for vaporizing refrigerant; a condenser for condensing refrigerant received from said generator means; evaporator means for evaporating refrigerant and providing a cooling effect; an absorber for receiving absorbent material from said generator means and for absorbing refrigerant vapor received from said evaporator means; an evaporation heat exchanger having a first compartment and a second compartment disposed in heat transfer relationship with the first compartment, said evaporation heat exchanger being operatively associated with said absorber and with said condenser so that a solution of refrigerant and absorbent material passes from said absorber into the first compartment of said evaporation heat exchanger and so that condensed refrigerant passes from said condenser into the second compartment of said evaporation heat exchanger, said evaporation heat exchanger also being operatively associated with said evaporator means so that a portion of the refrigerant evaporated within said evaporator means passes into the first compartment of said evaporation heat exchanger and is absorbed by the absorbent material disposed therewithin; another absorber operatively associated with the second compartment of said evaporation heat exchanger so as to receive refrigerant vapor therefrom and thus reduce the pressure within such second compartment and thereby effect evaporation of at least a portion of the condensed refrigerant within such second compartment and thus reduce the temperature of the solution of refrigerant and absorbent material disposed within the first compartment of said evaporatiotn heat exchanger and thus increase the saturation concentration of the refrigerant in the solution of refrigerant and absorbent material disposed within the first compartment of said evaporation heat exchanger; first delivery means for delivering at least a portion of the solution of refrigerant and absorbent material of increased refrigerant concentration from the first compartment of said evaporation heat exchanger and into said another absorber at a pressure that is higher than the pressure within the first compartment of said evaporation heat exchanger to thereby further increase within said another absorber the saturation concentration of refrigerant in the solution of refrigerant and absorbent material; and second delivery means for delivering at least a portion of the solution of refrigerant and absorbent material that is further increased in concentration of refrigerant from said another absorber to said generator means.

2. The refrigeration system in accordance with claim 1, in which said first delivery means and said second delivery means each includes a pump.

3. The refrigeration system in accordance with claim 1, in which means is provided for evaporatively cooling both said absorber and said another absorber to thereby dissipate heat from said absorber and from said another absorber.

4. A refrigeration system comprising the following connected to form a closed system: generator means including a rectifier section for vaporizing refrigerant; a condenser for condensing refrigerant received from said generator means; evaporator means for evaporating refrigerant and providing a cooling effect; an absorber for receiving absorbent materia from said generator means and for absorbing refrigerant vapor received from said evaporator means; a preheat exchanger thermally disposed to absorb heat given off by the action within said absorber to supply heat for boiling refrigerant vapor from a rich solution of refrigerant and absorbent material disposed within said preheat exchanger; an evaporation heat exchanger having a first compartment and a second compartment disposed in heat transfer relationship with the first compartment, said evaporation heat exchanger being operatively associated with said absorber and with said condenser so that a solution of refrigerant and absorbent material passes from said absorber into the first compartment of said evaporation heat exchanger and so that condensed refrigerant passes from said condenser into the second compartment of said evaporation heat exchanger, said evaporation heat exchanger also being operatively associated with said evaporator means so that a portion of the refrigerant evaporation within said evaporator means passes into the first compartment of said evaporation heat exchanger and is absorbed by the absorbent material disposed therein; another absorber operatively associated with the second compartment of said evaporation heat exchanger so as to draw refrigerant vapor therefrom and thus reduce the pressure within such second compartment and thereby effect evaporation of at least a portion of the condensed refrigerant within such second compartment and thus reduce the temperature of the solution of refrigerant and absorbent material disposed within the first compartment of said evaporation heat exchanger and thus increase the saturation concentration of refrigerant in the solution of refrigerant and absorbent material disposed within the first compartment of said evaporation heat exchanger; first delivery means for delyivering at heat exchanger; first delivery means for delivering at least a portion of the solution of refrigerant and absorbent material of increased refrigeration concentration from the first compartment of said evaporatiton heat exchanger and into said another absorber at a pressure that is higher than the pressure within the first compartment of said evaporation heat exchanger to thereby further increase within said another absorber the saturation concentration of refrigerant in solution of refrigerant and absorbent material; and second delivery means for delivering at least a portion of the solution of refrigerant and absorbent material that is further increased in concentration of refrigerant from said another absorber and through said preheat exchanger and to said generator means and for delivering another portion of the solution of refrigerant and absorbent material that is further increased in concentration of refrigerant from said another absorber to the rectifier section of said generator means.

5. The refrigeration system in accordance with claim 4, in which means is provided for evaporatively cooling both said absorber and said another absorber to thereby dissipate heat from said absorber and from said another absorber.

References Cited
UNITED STATES PATENTS

| | | | |
|---|---|---|---|
| 3,177,681 | 4/1965 | Phillips et al. | 62—483 |
| 3,396,549 | 8/1968 | McGrath | 62—489X |

WILLIAM E. WAYNER, Primary Examiner

U.S. Cl. X.R.

62—112, 489, 513